Sept. 2, 1969   Z. KRZEWINSKI ET AL   3,464,635
METHOD OF CONTINUOUS BEATING OF RAG MASS IN DISK-TYPE MILLS
Filed Nov. 7, 1966
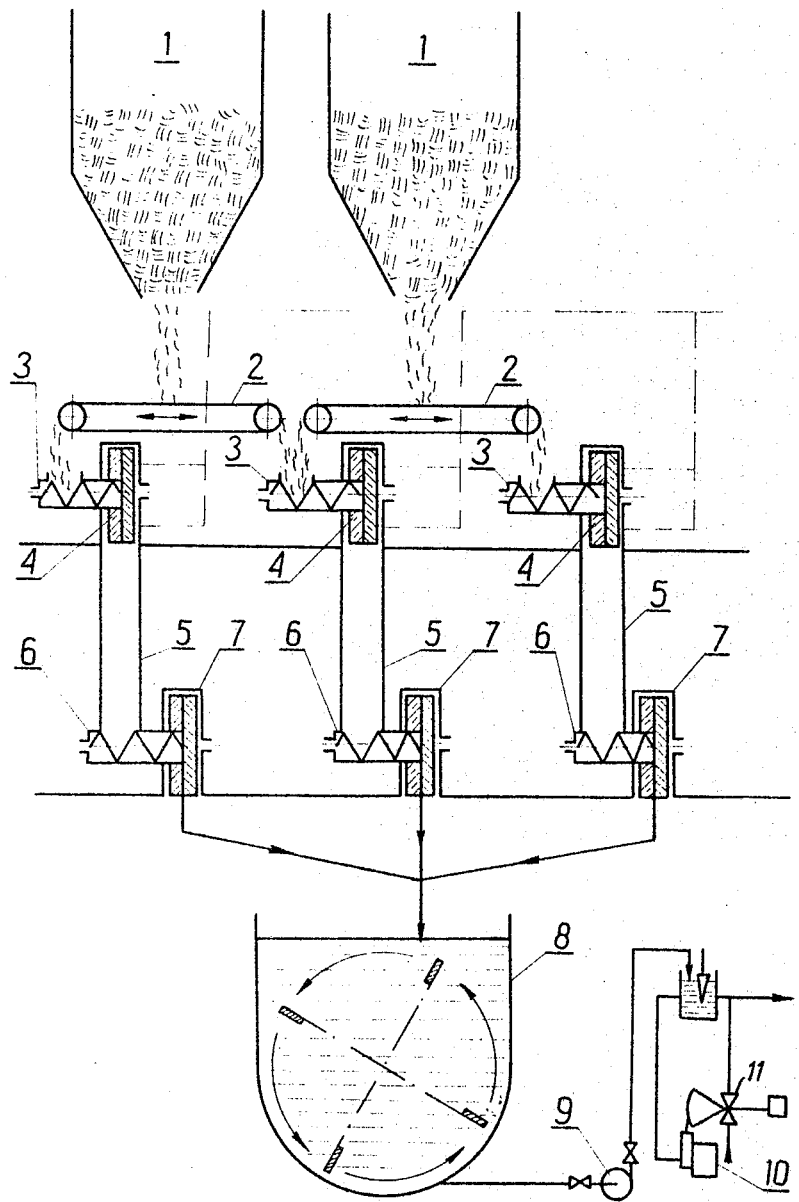

United States Patent Office 3,464,635
Patented Sept. 2, 1969

3,464,635
METHOD OF CONTINUOUS BEATING OF RAG MASS IN DISK-TYPE MILLS
Zbigniew Krzewinski, Eugeniusz Franciszczak, Jerzy Jerzykiewicz, and Janusz Kostrzewski, Cieplice, Poland, assignors to Fabryka Maszn Papierniczych, Cieplice, Poland
Filed Nov. 7, 1966, Ser. No. 592,390
Claims priority, application Poland, Nov. 10, 1965, P 111,550
Int. Cl. B02c 7/08, 23/02; B03b 7/00
U.S. Cl. 241—21                                                    1 Claim

ABSTRACT OF THE DISCLOSURE

A method and apparatus for treating raw rags comprising first milling in first and second zones in an air-dry state and a wet state respectively hydrating the milled mass, and second milling the mass.

---

The present invention relates to a method of defibering cut up raw rags and subsequently beating them in order to shorten the fibers to a length suitable for use as the main component of the composition destined to produce raw cardboard for tarred building cardboard and bituminous cardboard or the basic layer for linoleum.

The invention consists in providing a continuous method for processing the rag mass in which the raw material, during the first phase of treatment, remains in an air-dry condition.

The method of beating, according to the invention, is performed in two stages in disk-type mills which provides a significant decrease in demand for electric energy, area and volume of the production hall, personnel required, and improves substantially the work safety and occupational hygiene conditions while maintaining a steady degree of fineness of the mass by means of automating the manufacturing process.

The known method consists in using periodic operating beating engines in which, in a single working cycle, there is a complete treatment of the fibers, consisting in loosening the structure of the fabric, defiber in and shortening the fibers with simultaneous hydration and fibrillation. Nevertheless, in spite of getting from the beating engine a rag mass having requested technological properties, the periodic operation method requires work-consuming activities performed in a hot dusty atmosphere and time-consuming unloading work as well as significant demand for electric energy. This results not only from the circulation of the mass in the beating engine required by the technological conditions as well as from the adaptation of a universal cutter set, not suitable for particular phases of the treatment of the charge, such as defibering, beating etc., effected simultaneously in course of single operation.

The arrangement of beating engines used for treatment of the rag mass needs a large area and volume for the production hall and capital outlays as well as work-consuming activities connected with exchange of the cutting assemblies.

The method of beating the rag mass according to the present invention in which the single figure shows the manner in which the rags are cut up into fine particles, by means of feeders 1, fed to reversible conveyors 2, each of which feeds one of two first stage disk-type mills 4.

The disk-type mills 4 are supplied by means of helical conveyors 3. The initially milled mass from the first stage mills 4 falls directly through shafts 5 onto helical conveyors 6 thus supplying the second stage mills 7. Thus every one of the mills of the first stage is coupled with one mill of the second stage.

After the mass is completely milled in the second stage mill, it falls into a collecting mixing ladle 8, from which it is drawn off by means of a pump 9 and fed through a mass concentration controller 10 and a mass metering device 11.

Technological conditions of milling the rag mass are defined as follows:

The rags are cut up into pieces having an average dimension of less than 40 x 40 mm. and are supplied in an air-dry state to the milling chamber of the first stage mill. The cutting disks of the first stage mill are provided with two zones of a variegated cutter system, according to two of the technological phases occurring at this stage. In the first zone, the inner ring of the cutter-disk, the tearing of the structure of the fabric and of the weave is performed, and in the second zone, an outer ring of the cutter-disk, the preliminary shortening and fibrillation of fibers is performed.

In the first zone the raw material is treated in an air-dry state. Before the second zone of the first stage, water is supplied in order to treat the raw material in the second zone in a wet state. The concentration of the mass in this phase of the process amounts to 10–20%. The mass, pretreated in the first stage is then diluted to a concentration of 4–8% and is supplied to the milling chamber of the second stage mill.

In the second stage of processing there are single-zone cutter-disks for finishing treatment of the fibers by shortening, fibrillation and hydration of the fibers.

After the second stage of processing, the prepared mass is diluted to a concentration of 2.5–4% and stored in collecting mixing ladles.

What we claim is:
1. A method of continuous milling of a rag mass in disk-type mills, which milled rag mass is used for the production of raw cardboard for tarred and bituminous building cardboard and for the basic layer for linoleum comprising the steps of cutting the rag mass into small pieces of no greater than 40 x 40 mm. in an air-dry state, feeding said cut rag mass to first stage disk-type mills having a variegated cutter system and in which the rags are treated in two subsequent technological operational phases, the first of which consists in tearing the fabric and weave of the fibers in an air-dry state and the second of which consists in a preliminary defibering and shortening of the fibers in a wet state at a concentration of 10 to 20%, diluting the mass to a concentration of 4 to 8% and feeding it to a second mill, performing second milling to further shorten the fibers and effect fibrillation and hydration, and feeding the processed mass to collecting and mixing ladle.

References Cited

UNITED STATES PATENTS

| | | | |
|---|---|---|---|
| 1,507,605 | 9/1924 | Howe et al. | 241—21 |
| 1,717,266 | 6/1929 | Schouten | 241—29 X |
| 1,795,603 | 3/1931 | Hussey | 241—28 X |
| 1,913,540 | 6/1933 | Fritz | 241—21 |
| 1,917,505 | 7/1933 | De Cew | 241—21 |
| 1,937,156 | 11/1933 | Knoll | 241—21 |
| 2,113,297 | 4/1938 | Ellis et al. | 241—21 X |
| 2,717,195 | 9/1955 | Armstrong | 241—28 X |

FRANK T. YOST, Primary Examiner

U.S. Cl. X.R.

241—29